June 15, 1965
H. F. ROLLER
3,188,930
SIMULATED LENS MOUNT
Filed Oct. 29, 1962
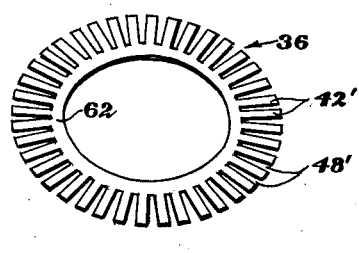
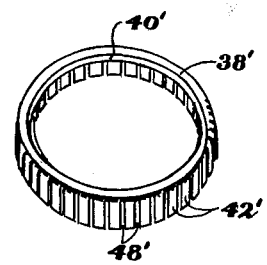
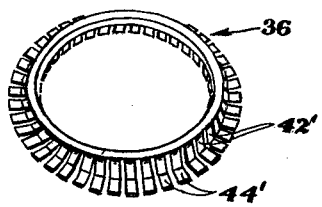
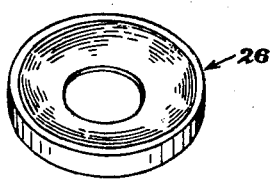
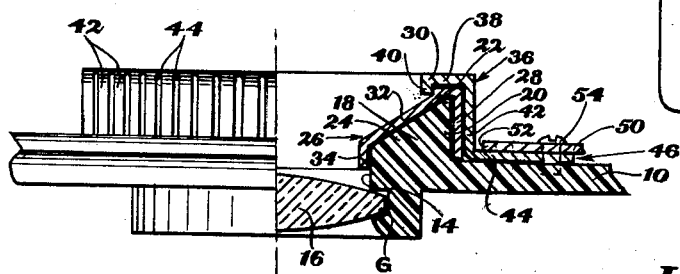
Harvey F. Roller
INVENTOR.
BY
ATTORNEYS 3,188,930
SIMULATED LENS MOUNT
Harvey F. Roller, Rochester, N.Y., assignor to Eastman Kodak Company, Rochester, N.Y., a corporation of New Jersey
Filed Oct. 29, 1962, Ser. No. 233,819
2 Claims. (Cl. 95—11)

This invention relates to a simulated lens mount for photographic apparatus.

Expensive photographic cameras are ordinarily provided with a tubular lens mount projecting from the front wall of the camera housing in coaxial relation with the optical axis. The lens mount, which can in some instances be removable to facilitate the substitution of a different lens system such as wide angle or telephoto for the normal lens system supplied with the camera, generally has its outer surface engraved or otherwise machined to define a decorative surface which both enhances the appearance, and marks suitable protographic indicia thereon. Generally, the outer surface of the tubular mount is first machine turned in a lathe and then polished after which the markings are cut or engraved into the surface and filled with a contrasting color of paint to enhance the highlights of the surface.

In less expensive cameras, wherein a single lens is located in a wall of the camera on the optical axis, it is desirable to provide a simulated lens mount so as to more nearly approximate the appearance of a more expensive camera. However, engraving the surface of the simulated tubular lens mount so as to enhance its appearance is expensive and hence not practical.

An object of this invention is to provide a simulated lens mount for photographic apparatus which eliminates the costly manufacturing operations of turning, engraving and filling the surface of such a lens mount while at the same time presenting the appearance of a lens mount made in the conventional manner.

Another object of this invention is to combine a colored insert with an overlapping tubular member having an ornamental open work pattern to form a relatively inexpensive simulated lens mount which presents the appearance of an expensive engraved and filled construction.

Other objects and a fuller understanding of the invention can be had by referring to the following description and claims taken in conjunction with the accompanying drawing in which:

FIG. 1 is a plan view, partly in cross-section, of a camera incorporating my invention;

FIG. 2 is an enlarged plan view, partly in cross-section, illustrating the lens mount attached to the front wall of a photographic camera;

FIG. 3 is a perspective view of the blanked member showing a plurality of radial fingers located thereon;

FIG. 4 is a view similar to FIG. 3 but showing the radial fingers bent in one direction and the circular inner peripheral surface adjacent the aperture drawn in the same direction;

FIG. 5 is a view similar to FIG. 4 but showing the outermost portions of the fingers offset to form a flanged retainer;

FIG. 6 is a perspective view of the colored insert; and

FIG. 7 is a perspective view of the insert positioned concentrically within the retainer to form the simulated lens mount.

In order to facilitate the understanding of the novel lens mount and method of forming the same, a brief summary of the assembly will be helpful. A cup-shaped retainer which has a cylindrical portion formed of a plurality of evenly spaced fingers, each of which are bent outwardly at their rear end portion to form a flange, is concentrically positioned over a colored cylindrical insert to form a simulated lens mount. The spaced fingers co-operate with the insert to give the appearance of a solid tubular member which has been engraved and filled with a contrasting color. The assembly is then positioned on the front wall of a photographic apparatus in concentric relations to the optical axis of the apparatus. The flanged portion of the retainer is sandwiched between the front wall of the apparatus and a suitable face plate secured to the wall to hold the assembly in position.

Referring more particularly to FIGS. 1 and 2 of the drawings, the front wall 10 of a photographic camera housing 12 has a cylindrical aperture 14 extending therethrough. A lens 16 is located in the inner end of aperture 14 by any suitable means, but here shown as a groove G and into which the edge of the lens extends. A circular ridge member 18 surrounds aperture 14 and projects forwardly from the front surface of wall 10. Ridge 18 includes an outer cylindrical wall 20, a front shoulder 22 and an inwardly tapering surface 24 which joins with the wall opening 14.

A circular insert 26, which includes a cylindrical skirt 28, a shoulder 30, and a tapered surface 32, fits over ridge member 18. The tapered surface 32 terminates in an inwardly turned rim 34 whose outer peripheral surface is bounded by the inner peripheral surface of aperture 14.

A circular retainer 36 concentrically fits over insert 26 and serves to hold the insert on ridge member 18. Retainer 36 includes a ring-shaped front end portion 38 and a rearwardly extending re-entrant inner lip 40. A plurality of spaced fingers 42 extend rearwardly from the front end portion 38 to form the cylindrical outer wall portion of the retainer 36. The rearmost end 44 of each finger 42 is bent outwardly so that together the ends 44 form a circular flange 46. The fingers 42 are evenly spaced about the periphery of front end portion 38 and are of sufficient lengths to form slot 48 extending the length of skirt 28 of insert 26. Thus the spaced rearwardly extending fingers 42 form an open work pattern in the form of parallel slots and co-operate with skirt 28 of insert 26 to provide the ridged surface having the appearance and feel of a turned surface having spaced parallel grooves engraved therein. The tapered surface 32 of insert 26 generally is colored black to give the appearance of depth and to diffuse or absorb stray light rays. Retainer 36 is preferably formed of a shiny, polished metal such as stainless steel so that spaced fingers 42 and skirt 28 of insert 26, of which can be of any color, cooperate to provide a simulated engraved and filled surface.

A face plate 50, which has an aperture 52 located therein of a size suitable to accommodate the outwardly projecting retainer 36 fits over the flange 46 and is fastened to the front wall 10 by any suitable means such as screws 54. Face plate 50 thus securely clamps flange 46 of retainer 36 to front wall 10 with the front end portion 38 of retainer 36 bearing on shoulder 30 of insert 26 to firmly hold the insert in position on ridge member 18.

While the novel retainer and insert assembly has been described above as being mounted in conjunction with ridge member 18, it is obvious that ridge member 18 only provides a convenient means for positioning the assembly on the housing wall 10. Obviously, if desired, ridge member 18 can be eliminated, as the retainer and insert assembly is sufficiently rigid to be self-supporting and rim 34 can be relied upon to properly locate the assembly relative to aperture 14.

The method of forming the retainer and insert assembly will now be described with particular reference being made to FIGS. 3–6. To form the retainer member 36, a generally circular ring-shaped member 36', which is to be further shaped as described hereinbelow, is first blanked from a sheet of metal by co-operating dies in any well known manner. (See FIG. 3.) Preferably member 36' is blanked from a sheet metal material such as stainless steel which has one side buffed to a bright, lustrous finish.

As best shown in FIG. 3, the blanked member 36' has a solid ring portion 62 from which a plurality of evenly spaced fingers 42' extend radially, said fingers being separated from each other by slots 48'. Each finger is blanked so as to have a substantially constant width from end to end.

As best shown in FIG. 4 in which the bright, lustrous side is facing upwardly, fingers 42' are shown as having been turned down at a right angle to circular ring portion 62 by simultaneously bending all of the fingers downwardly between suitably co-operating male and female drawing dies, not shown. Fingers 42' now form the substantially tubular slotted portion of retainer 36 with the slots 48' separating the fingers.

The co-operating male and female dies at the end of their stroke also preferably perform a drawing operation on the inner peripheral area of ring portion 62 to form a downwardly directed surface 40' which constitutes the re-entrant lip 40 of the retainer. It will be obvious that the drawing operation could be accomplished by a separate operation and a separate set of dies. The remaining horizontal portion 38' of ring portion 62 constitutes the front end portion 38 of the completed circular retainer 36.

Either in the same forming operation as described in FIG. 4 or in a subsequent forming operation, the ends 44' of fingers 42' are offset so as to extend radially outwardly from the periphery of the tubular portion formed by fingers 42' (see FIG. 5). Ends 44' lie in a plane common to each other to form the flanged portion 46 of the finished retainer. The plane of flange portion 46 is substantially perpendicular to the axis of the tubular portion of the retainer. The resulting configuration constitutes the finished retainer 36.

Insert 26, which is shown by itself in FIG. 6, is then fully inserted into the open end of retainer 36 as shown in FIG. 7 and the assembled retainer and insert are then positioned over ridge 18 on the front wall 10, as best shown in FIG. 1. Face plate 50 is then slipped over the assembled retainer and insert and fastened to wall 10 thus sandwiching the flange 46 therebetween for retaining the assembly in position.

It will be obvious that modifications can be made to the blank member 36' to attain various fundamental configurations which simulate an engraved surface. For example, fingers 42' of blanked member 36' can be formed with a tapered width which would result in a tapered portion of the insert being exposed when assembled.

In addition, the particular embodiment of the retainer and insert assembly described hereinabove pertains to a tubular configuration projecting from the housing of photographic apparatus. It is apparent that the novel assembly and the method of making the same is also applicable to other configurations, such as a truncated tubular member, without departing from the scope of the invention.

The invention has been described in detail with particular reference to a preferred embodiment thereof, but it will be understood that variations and modifications can be effected within the spirit and scope of the invention as described hereinabove and as defined in the appended claims.

I claim:
1. A retainer and insert assembly to form a simulated lens mount for photographic apparatus having an optical lens, and a front wall provided with an aperture therethrough for transmitting light to said lens, said assembly comprising:
 (a) an insert located on the front side of said wall and including a cylindrical skirt extending forwardly from said wall in concentric relation with said aperture and having its outer cylindrical surface distinctively colored, a circular shoulder forming the forward end of said insert, and an inner surface tapered rearwardly and inwardly from said shoulder towards said optical lens and terminating at its rearward end in a central opening aligned with and of the same size as said aperture; and
 (b) a retainer including a generally cylindrical openwork portion adapted to overlie said skirt of said insert, an apertured circular front end portion overlying and engaging said shoulder of said insert, and an outwardly extending flange at the rear end of said cylindrical portion secured to said front side of said front wall, whereby said retainer holds said insert in fixed position relative to said aperture, and said distinctively colored surface of said insert is visible through said open work portion of said retainer.

2. A retainer and insert assembly to form a simulated lens mount for photographic apparatus having an optical lens, and a front wall provided with an aperture therethrough for transmitting light to said lens, said assembly comprising:
 (a) an insert located on the front side of said wall and including a cylindrical skirt extending forwardly from said wall and positioned concentric to said aperture, a circular shoulder forming the forward end of said insert, and an inner surface tapered rearwardly and inwardly from said shoulder towards said optical lens and terminating at its rearward end in a central opening aligned with and of the same size as said aperture; and
 (b) a retainer including a generally cylindrical openwork portion adapted to overlie said skirt of said insert, an apertured circular front end portion overlying and engaging said shoulder of said insert, and an outwardly extending flange at the rear end of said cylindrical retainer secured to said front side of said front wall, whereby said retainer holds said insert in fixed position relative to said aperture, and wherein said cylindrical and flange portions of said retainer are formed by a plurality of circumferentially spaced fingers extending rearwardly and outwardly respectively from the periphery of said front end portion.

References Cited by the Examiner

UNITED STATES PATENTS

| | | | |
|---|---|---|---|
| 1,262,347 | 4/18 | Ide | 95—45 |
| 1,687,818 | 10/28 | Wollensak | 88—57 |
| 2,112,653 | 3/38 | McLennan | 29—252 |

NORTON ANSHER, *Primary Examiner.*

JOHN M. HORAN, *Examiner.*